(12) United States Patent
Leese et al.

(10) Patent No.: US 10,287,204 B2
(45) Date of Patent: *May 14, 2019

(54) PELLET

(71) Applicant: Sibelco UK Ltd., Sandbach, Cheshire (GB)

(72) Inventors: Samuel Mark Leese, Sandbach (GB); John Alexander Stuart, Sandbach (GB)

(73) Assignee: Sibelco UK Ltd., Sandbach (GB)

( * ) Notice: Subject to any disclaimer, the term of this patent is extended or adjusted under 35 U.S.C. 154(b) by 674 days.

This patent is subject to a terminal disclaimer.

(21) Appl. No.: 14/795,656

(22) Filed: Jul. 9, 2015

(65) Prior Publication Data

US 2016/0002091 A1 Jan. 7, 2016

Related U.S. Application Data

(63) Continuation of application No. 13/982,116, filed as application No. PCT/GB2012/050141 on Jan. 24, 2012, now Pat. No. 9,096,457.

(30) Foreign Application Priority Data

Jan. 27, 2011 (GB) .................................. 1101387.7

(51) Int. Cl.
| | | |
|---|---|---|
| *B32B 9/04* | (2006.01) | |
| *B32B 9/00* | (2006.01) | |
| *B32B 13/04* | (2006.01) | |
| *B32B 19/00* | (2006.01) | |
| *C03C 17/00* | (2006.01) | |
| *B05D 7/00* | (2006.01) | |
| *C03C 1/02* | (2006.01) | |
| *C03B 1/02* | (2006.01) | |
| *C03C 3/078* | (2006.01) | |
| *C03B 5/00* | (2006.01) | |
| *C03B 5/16* | (2006.01) | |

(52) U.S. Cl.
CPC ................ *C03C 1/026* (2013.01); *C03B 1/02* (2013.01); *C03B 5/00* (2013.01); *C03B 5/16* (2013.01); *C03C 3/078* (2013.01)

(58) Field of Classification Search
CPC C03C 1/026; C03C 3/078; C03B 1/02; C03B 5/00; C03B 5/16
See application file for complete search history.

(56) References Cited

U.S. PATENT DOCUMENTS 2,229,416 A 1/1941 Lyle
3,924,030 A 12/1975 Tatara et al.
(Continued)

FOREIGN PATENT DOCUMENTS

EP 0 618 177 3/1994
EP 2 208 713 7/2010
(Continued)

OTHER PUBLICATIONS http://digitalfire.com/4sight/material/sodium_metasilicate_eutectic_2473.html, Internet retrieval date of Jan. 27, 2014.
(Continued)

*Primary Examiner* — Jonathan C Langman
(74) *Attorney, Agent, or Firm* — Fish & Richardson P.C.

(57) ABSTRACT

The present invention relates to pellets for use in the manufacture of glass.

16 Claims, 8 Drawing Sheets

(56) References Cited

U.S. PATENT DOCUMENTS

| | | | |
|---|---|---|---|
| 3,956,446 A | 5/1976 | Eirich et al. | |
| 4,293,324 A | 10/1981 | Saeman | |
| 4,354,864 A | 10/1982 | Saeman | |
| 4,418,153 A | 11/1983 | Saeman | |
| 9,096,457 B2 * | 8/2015 | Leese | C03C 1/026 |
| 2005/0022557 A1 | 2/2005 | Carly | |
| 2008/0087044 A1 | 4/2008 | Carty | |
| 2008/0312061 A1 | 12/2008 | Collart et al. | |

FOREIGN PATENT DOCUMENTS

| | | |
|---|---|---|
| GB | 1 172 318 | 11/1969 |
| GB | 1331673 | 9/1973 |
| JP | 55-100225 | 7/1980 |
| JP | 57-145035 | 9/1982 |
| WO | 2003/074434 | 9/2003 |
| WO | 2009/001586 | 12/2008 |
| WO | 2010/139739 | 12/2010 |

OTHER PUBLICATIONS

International Preliminary Report on Patentability in International Application No. PCT/GB2012/050141, dated Jul. 30, 2013, 8 pages.
International Preliminary Report on Patentability in International Application No. PCT/GB2013/050923, dated Oct. 21, 2014, 6 pages.
International Search Report and Written Opinion dated Sep. 6, 2012 for corresponding application PCT/GB2012/050141 (15 pages).
International Search Report and Written Opinion in International Application No. PCT/GB2013/050923, dated Jul. 8, 2013, 9 pages.

* cited by examiner

Table 7 – Example glass compositions (amounts in % w/w)

| | Low Iron Float/Container | Float | Bulbs/Table | Potash/Lead | Oven/Lab |
|---|---|---|---|---|---|
| $SiO_2$ | 70-73.5 | 70-73 | 70.0-72.5 | 55-56 | 80.0-81.0 |
| $Al_2O_3$ | 0.4-2.2 | 0.5-1.5 | 0.3-2.6 | 0-0.2 | 2.2-3.1 |
| $TiO_2$ | | | | | |
| $Fe_2O_3$ | <0.03 | <0.1 | <0.03 | <0.02 | <0.05 |
| CaO | 7.8-10.8 | 8-11 | 5.4-6.5 | 0.0- 0.2 | 0.0-0.2 |
| MgO | 0.1-4.0 | 1-4 | 3-4.5 | | |
| $K_2O$ | 0.4-1.0 | 0.3-0.8 | 0.3-1.2 | 11-12 | 0.0-0.3 |
| $Na_2O$ | 12.5-15.5 | 13-15 | 15.8-17 | 0.0-0.2 | 3.9-4.5 |
| PbO | | | | 31-33 | |
| $B_2O_3$ | | | | | 12.0-13.0 |
| $SO_3$ | 0.2 | 0.25-0.3 | | | |
| $F_2$ | | | | | |
| FeO | | | | | |

FIG. 7

Table 8 – Example glass fibre compositions (amounts in % w/w)

| | Insulation | Insulation | Electrical | Chemical Resistant | Strength | Advantex | Borated E | Duran (test tubes) |
|---|---|---|---|---|---|---|---|---|
| | T1* | T2* | E | C* | S | E | E | |
| SiO$_2$ | 63 | 58.6 | 52-56 | 64-68 | 64 | 61 | 56 | 81 |
| Al$_2$O$_3$ | 5 | 3.2 | 12-16 | 3.5 | 25 | 13 | 14 | 2 |
| TiO$_2$ | | | 0-1.5 | 0-1 | | 0.2 | 0.2 | |
| Fe$_2$O$_3$ | | | | 0.8 | | 0.3 | | |
| CaO | 14 | 8 | 16-25 | 11-15 | | 22.4 | 22.2 | |
| MgO | 3 | 4.2 | 0-6 | 2-4 | 10 | 3 | | |
| K$_2$O | 10 | 15.1 | 0.0-2.0 | 7-10 | | 0.1 | | 2 |
| Na$_2$O | | | | | | 0.8 | 0.7 | 2 |
| PbO | | | | | | | | |
| B$_2$O$_3$ | 5 | 10.1 | 5-10 | 4.6 | | 0 | 6.5 | 13 |
| SO$_3$ | | | | | | | | |
| F$_2$ | | | 0-1 | | | | | |
| FeO | | | 0.8 | | | | | |

Key: T1 & T2 = insulating; E = electrical; C = chemical resistance; S = strength.

FIG. 8

PELLET

CROSS-REFERENCE TO RELATED APPLICATIONS

This application is a continuation of U.S. patent application Ser. No. 13/982,116, filed Jul. 26, 2013, which is a National Stage application under 35 U.S.C. § 371 of International Application No. PCT/GB2012/050141, having an International Filing Date of Jan. 24, 2012, which claims the benefit of GB Application No. 1101387.7, filed Jan. 27, 2011. The above applications are hereby incorporated by reference in their entirety.

DESCRIPTION OF INVENTION

The present invention relates to a pellet. In particular, the present invention relates to a pellet for use in a glass batch process. The present invention also relates to a process for the production of such a pellet, as well as a method for making glass.

Glass is an amorphous, non-crystalline, solid material. Glasses are typically brittle and often optically transparent. A glass is defined as an inorganic product of fusion which has been cooled through its glass transition to the solid state without crystallising. The main component of most glasses, in general use, is silica ($SiO_2$).

Pure silica has a relatively high glass melting point of over 2300° C. Pure silica can be made into glass for special applications. However, it is common to add substances to common glass to simplify processing. One component added to silica in a glass is sodium carbonate ($Na_2CO_3$) which lowers the melting point to about 1500° C. However, sodium carbonate makes glass water soluble, which is usually undesirable, so lime (calcium oxide, CaO) is often added, to provide a better chemical durability. Some magnesium oxide (MgO) and/or aluminium oxide ($Al_2O_3$) is/are sometimes added, also to provide a better chemical durability. Many glasses have other ingredients added to change their properties, depending on their intended function.

Common glass is generally produced in a two step process, and then shaped to make it suitable for a variety of applications.

The first step is batch mixing. The mixture of ingredients to make up the glass (typically, silica, sodium carbonate, calcium carbonate and recycled glass, together with small quantities of various other trace ingredients) are mixed, to ensure an even mix of ingredients, and fed into the furnace.

In the second step, the mixture is heated to around 1450° C., where the ingredients melt, various chemical reactions take place and $CO_2$ and $SO_3$ are evolved. These chemical reactions form molten glass (or, 'glass solution') which can be moulded and cooled.

The most common furnace used for manufacturing glass solution is a continuous regenerative type, with either the side or the end ports connecting brick checkers to the inside of the melter. Checkers conserve fuel by acting as heat exchangers; the fuel combustion products heat incoming combustion air. The molten glass is refined (heat conditioning) and is then pressed, blown, drawn, rolled or floated, depending on the final product.

British patent number GB 1331673 relates to a process for making glass batches in pelletized form. GB 1331673 discusses the disadvantages associated with loose glass batches, i.e. loose mixtures of the ingredients which are combined in a glass solution. Loose glass batches are used in many glass manufacturing processes. Loose glass batches give a strong tendency to dust during weighing, mixing and charging. This endangers the health of those who are involved with batch preparation and glass melting. The use of a loose batch also suffers from the disadvantage of heat being lost from the top of the melter during the batch melting process. In this regard, batch melting requires the use of a lot of energy, given the temperatures involved. Loss of heat is a disadvantage because glass manufacturers are striving to minimise their use of energy, i.e. to be more efficient, thus minimising their environmental impact and saving on costs.

GB 1331673 discusses the idea of pelletizing glass batches. The formation of granular aggregations or pellets during the pelletization takes place by imparting a rotary movement to the batch during simultaneous injection of a finer divided liquid, e.g. water or a solution of binder and water. These pellets are more easily transported than loose batches and are less damaging to health because they do not give off dust.

During the glass manufacturing procedure, the melting of the various constituents of the solid components of the glass is necessary. Previous pelletized batches and/or loose batches used in the glass manufacturing process have been homogenous mixtures of the components required in the glass.

U.S. Pat. No. 4,418,153 discloses the use of layered glass batch pellets in a glass manufacturing process. These are said to be homogenous compositions from the interior of the pellet to the surface. The layered approach was used in U.S. Pat. No. 4,418,153 as a new way of forming glass batch pellets in a relatively efficient manner. The pellets produced in U.S. Pat. No. 4,418,153 are glass batch pellets for silicate glass compositions whose principal use if for flat glass, container glass, lighting wear, laboratory wear, light bulbs, and tumblers as well as in glass fibre installation. The layers in the pellets provide layers of the same composition.

To reiterate, the glass batch pellets produced in U.S. Pat. No. 4,418,153 have a homogenous cross-sectional composition from the interior to the surface.

A process for the production of layered glass batch pellets is also discussed in U.S. Pat. No. 4,354,864. This document describes a so-called "Lancaster mixer" which is used to prepare layered glass batch pellets.

PCT/US03/05962 discusses the reaction paths taken by raw material batch components when reacting with each other in a glass melt process. PCT/US03/05962 identifies problems with glass production in that segregation of components can occur, which reduces efficiency.

As mentioned in PCT/US03/05962, in the US glass industry alone, in excess of 250 trillion BTU is used annually to produce approximately 21 million tons of glass products; approximately 80% of this energy is supplied by natural gas. Melting one ton of glass should theoretically require only about 2.2 million BTU, but in reality it can range from 4.7 to 6.9 million BTU per ton due to losses and inefficiencies. Given this discussion, there is a need in the art for making glass manufacturing more efficient, so that less energy is required per unit of glass manufactured.

One way of mitigating this problem provided by PCT/US03/05962 is to selectively pre-combine certain components of a glass batch recipe, prior to introducing the overall batch composition into a furnace melting tank. These combinations of ingredients are created in a plurality of discreet reaction members formed while pelletizing different combinations of materials.

In a typical glass production process, using glass batches in pelletized form, or loose batches, the batches are introduced into the furnace and there is a heat gradient down the furnace. In another glass production process, there is a constant temperature down the furnace. The components are all mixed together in the furnace and there are various, complicated, reactions which ultimately lead to the production of glass.

Typically, in a glass melt process, the addition of silica results in a high viscosity of the glass solution. Therefore, addition of all of the ingredients as a raw mixture at the start of a melting process results in a relatively high viscosity of the entire mixture. A higher viscosity means that more energy is required to melt all of the components into the glass solution. The general overall high viscosity means that there is an overall higher melting point of the components.

It would, therefore, be preferable to have as low a viscosity as possible prior to the addition of silica into the reaction mixture. In other words, it would be preferable to melt components of a glass melt solution is a specific order prior to the addition of silica so that the overall energy required to melt the glass components is less, prior to the addition of silica.

According to a first aspect of the present invention, there is provided, a pellet for use in a glass batch process, comprising:
  a core comprising silica ($SiO_2$), and,
  one, or more, layers over the core, at least one of the layers over the core being a eutectic layer or a near eutectic layer.

It is believed that the pellets of the present invention act to make glass melt processes more efficient, when compared to earlier ways of making glass. The use of the pellets of the present invention in a glass melt process uses less energy per unit of glass produced than compared with earlier pellets and/or loose batches used in glass batch production.

Preferably, wherein the near eutectic layer varies in composition by up to 10% by % w/w from a eutectic composition.

Further preferably, wherein the near eutectic layer varies in composition by up to 9%, or 8%, or 7%, or 6%, or 5%, or 4%, or 3%, or 2% or 1% by % w/w from a eutectic composition.

Optionally, the pellet comprises:
  one eutectic or near eutectic layer over the core, and,
  one non-eutectic layer over the eutectic or near eutectic layer.

Advantageously, comprising:
  two eutectic or near eutectic layers over the core.

Preferably, comprising:
  three, or more, eutectic and/or near eutectic layers over the core.

Further preferably, wherein the eutectic or near eutectic layers are continuous.

Optionally, wherein the core further comprises trace ingredients of a glass.

Advantageously, wherein the core comprises one or more decolourisers.

Preferably, wherein the one or more decolourisers comprise selenium, barium selenite and/or erbium oxide Further preferably, wherein at least one of the eutectic layers consists essentially of a eutectic mixture of $SiO_2$ and $Na_2O$.

Advantageously, wherein at least one of the layers consists essentially of a mixture of $Na_2CO_3$ and $CaCO_3$.

Preferably, wherein the pellet comprises:
  a core comprising silica ($SiO_2$),
  a first eutectic layer or near eutectic layer over the core consisting essentially of a eutectic or near eutectic mixture of $SiO_2$ and $Na_2O$, and
  a second layer over the first eutectic layer consisting essentially of a mixture of $Na_2CO_3$ and $CaCO_3$.

Further preferably, wherein the core and the one or more layers are bound together by a binder.

Optionally, wherein the binder is water, an aqueous solution of sodium silicate, an aqueous solution of sodium carbonate, clay or cement.

Advantageously, wherein the pellet comprises all of the ingredients for preparing a glass by a batch process.

According to a further aspect of the present invention, there is provided a method of making a pellet for use in a glass batch process; the pellet comprising a core comprising silica ($SiO_2$), and, one, or more, layers over the core, at least one of the layers over the core being a eutectic layer or a near eutectic layer; the process comprising the steps of;
  pelletising the components of the core comprising silica, and,
  pelletising the components of the first eutectic layer or near eutectic layer, and the pelletised core comprising silica, so that the components of the first eutectic layer or a near eutectic layer form a eutectic layer or a near eutectic over the core.

Preferably, wherein the near eutectic layer varies in composition by up to 10% by % w/w from a eutectic composition.

Further preferably, wherein the near eutectic layer varies in composition by up to 9%, or 8%, or 7%, or 6%, or 5%, or 4%, or 3%, or 2% or 1% by % w/w from a eutectic composition.

Advantageously, wherein the method further comprises the step of:
  pelletising the components of a non-eutectic layer over the pellet comprising a core comprising silica ($SiO_2$) and a eutectic layer or a near eutectic layer.

Preferably, further comprising the step of:
  pelletising a further eutectic layer or a further near eutectic layer over the core.

Further preferably, further comprising the step of:
  pelletising three, or more, eutectic layers and/or near eutectic layers over the core.

Advantageously, further comprising the step of including trace ingredients of a glass in the core.

Preferably, further comprising the step of including one or more decolourisers in the core, preferably wherein the decolourisers are selenium, barium selenite and/or erbium oxide Further preferably, wherein the step of pelletising the components of the first eutectic layer or near eutectic layer includes pelletising a eutectic mixture or near eutectic mixture of $SiO_2$ and $Na_2O$ over the core.

Advantageously, wherein the step of pelletising the components of a non-eutectic layer over the pellet includes pelletising a mixture of $Na_2CO_3$ and $CaCO_3$.

Preferably, further comprising the step of binding the core and the one or more layers together with a binder, optionally, wherein the binder is water, an aqueous solution of sodium silicate, an aqueous solution of sodium carbonate, clay or cement.

The present invention also provides a method of making glass, comprising the steps of:
  introducing one or more pellets comprising a core comprising silica ($SiO_2$), and, one, or more, layers over the core, at least one of the layers over the core being a eutectic layer or a near eutectic layer, into a glass melt furnace,
  heating the one or more pellets to produce a glass solution, and, cooling the glass solution to make a glass.

Preferably, wherein the near eutectic layer varies in composition by up to 10% by % w/w from a eutectic composition.

Further preferably, wherein the near eutectic layer varies in composition by up to 9%, or 8%, or 7%, or 6%, or 5%, or 4%, or 3%, or 2% or 1% by % w/w from a eutectic composition.

According to another aspect of the present invention, there is provided a method of making glass, comprising the steps of:
introducing one or more pellets according to the above into a reaction vessel,
heating the one or more pellets to produce a glass solution, and, cooling the glass solution to make a glass.

Embodiments of the invention are described below with reference to the accompanying drawings, in which:

FIG. 7 is a table showing example glass compositions.

FIG. 8 is a table showing example glass fibre compositions.

MANUFACTURING PROTOCOL FOR A LAYERED GLASS PELLET

Figure 1:
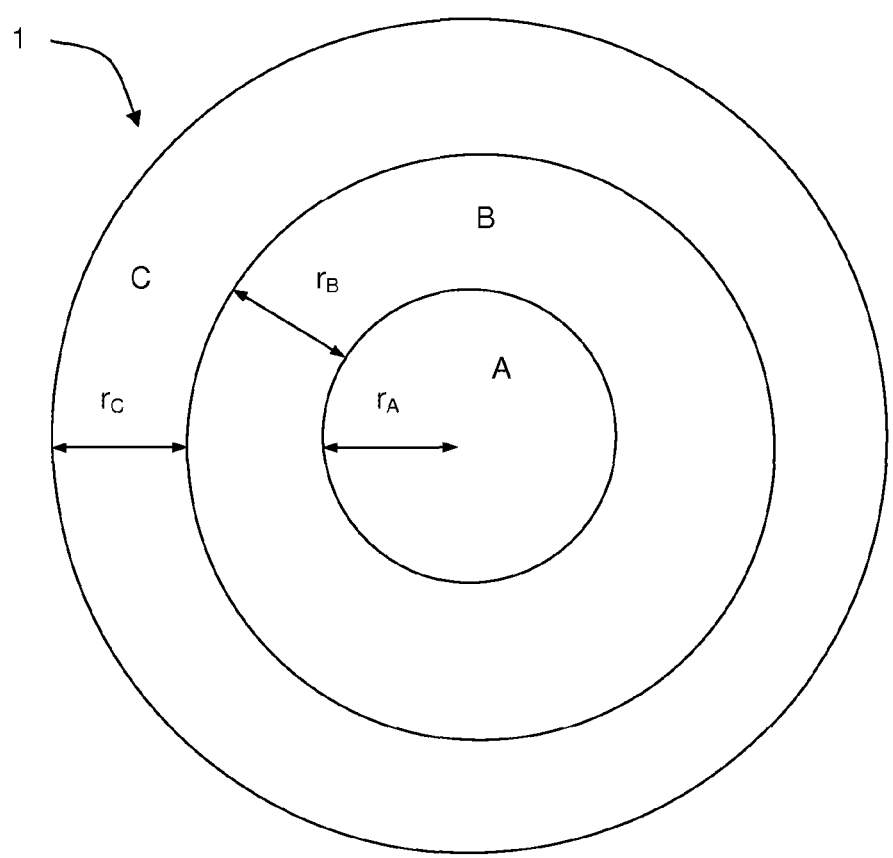
FIG. 1 is a cross-sectional view of an exemplary pellet which is approximately spherical.

Manufacturing one or more layered glass pellets according to the present invention requires a sequential batch process in which predetermined quantities of materials contained in the core are accurately weighted, having first corrected for any included moisture. These ingredients are introduced into a suitable mixer and homogenised. When the ingredients of the core are thoroughly mixed, a suitable binder is added, if required. Suitable binders include, but are not limited to, water, sodium silicates, sodium carbonate, organic and inorganic chemical binders and cements generally available in industry. Mixing of the core components is continued until granulation has occurred. The various times, energies, temperatures and the need for drying are specific for each type of mixer, and can be selected as necessary.

Following creation of the core, progressive layers of constituents are added to the core in a sequential process, either in one mixing device or several mixing devices in series. The creation of each layer requires the pre-weighing and mixing of the desired layer components. The various times, energies, temperatures and the need for drying are specific for each type of mixer, and can be selected as necessary.

In the later stages of preparing pellets according to the present invention, drying or preheating of the components of each layer may be used to consolidate and dry the pellets, or condition the pellets for eventual addition to a glass batch, respectively.

Mixing, blending, core pelletization and subsequent, further, layering can also be undertaken in a series of different mixing stages. This depends on the mixer being used and on a user's preference, i.e. this can depend on the type of glass to be manufactured by the pellets.

U.S. Pat. No. 4,418,153 describes a mixer which could be used to prepare a layered glass pellet according to one embodiment of the present invention.

In an exemplary process for forming a layered pellet, each of the layer mixtures are pre-blended, crushed and/or ground, as required, by a suitable method including, but not limited to, jaw crushing, roll milling and ball milling. In the example, non-limiting, pellet discussed below, a three layer pellet was prepared, the innermost layer, or core, is 'fine' silica sand ($SiO_2$), with no blending or grinding required. The second layer is a eutectic mixture of the same silica sand ($SiO_2$) as the inner layer blended with $Na_2O$. The outer layer includes limestone ($CaCO_3$) and sodium carbonate ($Na_2CO_3$), which was blended and crushed using a roll mill to reduce the large particle size of the limestone and ensure homogeneity of the mixture.

The desired amount of the inner layer, or core, was placed in an Eirich™ pan pelletiser. Exemplary Eirich™ pelletisers range from small R11 types to production types, e.g. DE 22 types; although, other types of pan pelletiser can be used. The Eirich™ pan pelletiser was operated at a pan rotation speed of 20 to 200 rpm and a mixer arm rotation speed of 0 to 500 rpm. Pan and material temperatures were controlled between 0 and 60° C. As the material tumbled around the pan, a fine mist spray of a binder dissolved in water at 5-50% solution was introduced, after adding 0.5 to 2% by dry weight of the selected binder, in this case sodium silicate solution (but other binders could be used), was introduced at a level so as to cause the material to aggregate into fine pellets. Pellet formation occurs within a few seconds but it can take up to 5 minutes for the pellets to reach a uniform size and shape (generally spherical).

Once the pellets were of a similar size, two possibilities were employed for introducing the next layer.

The first possibility was to discharge the pellets and further layer the pellets sequentially in a series of similar mixers, by the addition of correctly weighed, batched and proportional second layer eutectic blend. The materials for the second layer were introduced, along with further binder additions, to keep the surface of the growing pellets damp so that the freshly added material adhered preferentially to the existing pellets. Formation of the second layer takes from 5 seconds to 5 minutes, depending on the volume and size of the second layer components.

The second possibility is to introduce the materials for the second layer into the same pelletiser as the pellets made in the formation of the core.

In this second possibility, the second material was slowly introduced, along with further binder additions to keep the surface of the growing pellets damp so that the freshly added material adhered preferentially to the existing pellets.

The third material was then introduced in the same manner.

The pellets resulting from both options mentioned above had dimensions of around 8 mm. The pellets were then transferred to, and dried, in a fan assisted oven at 110° C. to constant mass in preparation for testing and evaluation, and subsequent use in a glass making process.

Similar stages of layer formation occur with each subsequent layer until the final pellets are formed with the desired number of layers, each layer having its own chemical makeup, for any set of pellets' particular purpose. The layers can be selected to give the pellets a particular makeup for its desired glass batch chemistry, and with a chemical release sequence desired for optimum operation of the melting process.

Example of a Layered Pellet:

Referring now to FIG. 1, a pellet, which can be manufactured as set out above, is shown in cross-section.

The non-limiting example shown in FIG. 1 relates to a pellet 1 for use in a glass batch process which approximates as a spherical pellet. The approximately spherical pellet of FIG. 1 has a middle layer B and an outer layer C, both of which approximate as hollow spheres. Middle layer B surrounds central sphere A. Central sphere A is the innermost layer, or core, of the pellet. Outer layer C surrounds middle layer B. Middle layer B is continuous in the sense that outer layer C does not come into contact with central sphere A.

Looking at the approximately spherical pellet in FIG. 1, the volume ratios of the central sphere and the concentric spherical layers, with $r_A = r_B = r_C$, is as shown in Table 1.

TABLE 1

Volume ratios of the central sphere and concentric spherical layers with a = b = c

|  |  | r (cm) | V (cm^3) | Volume Ratio |
|---|---|---|---|---|
| Volume Of Sphere A | 4/3 * (pi) * $r_A^3$ | 1.00 | 4.1888 | 1.0000000 |
| Volume of Hollow Sphere B | 4/3 * (pi) * $(r_A + r_B)^3$ − 4/3 * (pi) * $r_A^3$ | 1.00 | 29.3215 | 7.0000000 |
| Volume of Hollow Sphere C | 4/3 * (pi) * $(r_A + r_B + r_C)^3$ − 4/3 * (pi) * $(r_A + r_B)^3$ | 1.00 | 79.587 | 19.0000000 |

In this example, the approximately spherical pellet in FIG. 1 has an overall radius $(r_A + r_B + r_C)$ of 3 cm.

In this A, B and C system, for a 1:1:1 volume ratio for each of sphere A and hollow spheres B and C, the r, for each of A $(r_A)$, B $(r_B)$ or C $(r_C)$, is calculated as shown in table 2.

TABLE 2

Radius ratios for 1:1:1 volume ratios in a 3 component system

|  |  | r (cm) | V (cm^3) | Volume Ratio |
|---|---|---|---|---|
| Volume Of Sphere A | 4/3 * (pi) * $r_A^3$ | 2.0000 | 33.5103 | 1.0000000 |
| Volume of Hollow Sphere B | 4/3 * (pi) * $(r_A + r_B)^3$ − 4/3 * (pi) * $r_A^3$ | 0.5198 | 33.5103 | 0.9999991 |
| Volume of Hollow Sphere C | 4/3 * (pi) * $(r_A + r_B + r_C)^3$ − 4/3 * (pi) * $(r_A + r_B)^3$ | 0.3647 | 33.5103 | 0.9999999 |

Compositionally, a typical Na—Ca—Si glass has the composition indicated in table 3.

TABLE 3

Composition of a typical Na—Ca—Si glass (in wt %)

| Oxide | Weight % |
|---|---|
| $SiO_2$ | 70 |
| CaO | 12.5 |
| $Na_2O$ | 12.5 |
| Total | 98 |

(The remainder being made up of trace constituents)

In this non-limiting example, as shown by the pellet of FIG. 1, the central sphere A, or core, is made up of silica and trace constituents, the middle layer B is made up of a $SiO_2$—$Na_2O$ eutectic mixture, and the outer layer C is made up of a $Na_2CO_3$—$CaCO_3$ mixture. Approximating the central sphere A as only including silica, the amounts, and volume ratios, of the constituents are as shown in table 4.

TABLE 4

Volume ratios for the composition given in Table 3, using carbonates for Na and Ca

| Layer | Material | Wt % Material (Total) | Wt % using only $Na_2CO_3$ | Wt % Raw Material (Normalised) |
|---|---|---|---|---|
| Central Sphere (A) | $SiO_2$ (99.5%) | 54.18 | 54.18 | 53.25 |
| Middle Layer (B) | $SiO_2$ (75%) | 15.82 | 15.82 | 15.55 |
|  | $Na_2O$ (25%) | 5.27 | 9.02 | 8.86 |
| Outer Layer (C) | $Na_2CO_3$ (45%) | 10.23 | 10.23 | 10.05 |
|  | $CaCO_3$ (55%) | 12.50 | 12.5 | 12.29 |
|  | Totals | 98.00 | 101.74 | 100.00 |

| Layer | Material | Density (g/cm3) | Vol % | Normalised Vol % |
|---|---|---|---|---|
| Central Sphere (A) | $SiO_2$ (99.5%) | 2.70 | 19.72 | 50.23 |
| Middle Layer (B) | $SiO_2$ (75%) | 2.70 | 5.76 | 14.67 |
|  | $Na_2O$ (25%) | 2.53 | 3.50 | 8.92 |
| Outer Layer (C) | $Na_2CO_3$ (45%) | 2.27 | 4.43 | 11.28 |
|  | $CaCO_3$ (55%) | 2.10 | 5.85 | 14.90 |
|  | Totals |  | 39.26 | 100.00 |

Therefore, the r values for the lengths of $r_A$, $r_B$ and $r_C$, from FIG. 1, are calculated as shown in table 5.

TABLE 5

Volume/Radius of the three layers resulting from the composition in Table 3, and the ratios of oxides in Table 4

| Required volume of each layer (% of total volume) | Adjusted vol ratio to make central sphere vol = 1.0 | r (cm) | V (cm³) |
|---|---|---|---|
| 50.23 | 1.000000 | 2.0000000 | 33.51032164 |
| 23.59 | 0.469527 | 0.2738120 | 15.73356208 |
| 26.18 | 0.521135 | 0.2420968 | 17.46340979 |

| Calculated volume ratio | Difference from required volume ratio |
|---|---|
| 1.000000 | 0.000000 |
| 0.469514 | −0.000013 |
| 0.521135 | 0.000001 |

In this example, the binder for the different layers is a solution of water and sodium silicate. In other embodiments, the binder for the different layers can be a solution of alkali metal carbonate in water, or another suitable binder.

In this example, the pellets have been approximated as spheres. This example has been selected to show the calculations required to measure the volumes and amounts of the different constituents of the example pellets, so that the desired layers are eutectic layers, where appropriate. The pellets may be made to be other shapes and sizes, e.g. the pellets may approximate as an ovoid, a cylinder, a prism, a cuboid, a cube, a pyramid, a cone or any other three dimensional shape.

The layers and/or eutectic layers may be equivalent three dimensional shapes to the core, or may be different shapes. The important calculation above is the amount of each substance to arrive at eutectic layers, as required.

By having different layers made up of different substituents, in the non-limiting example above, a core comprising silica (A), a middle eutectic layer (B) and an outer layer (C), the example pellets of the present invention can be introduced into a glass solution at a certain temperature which melts the outer layer. In this example, the outer layer is not strictly a eutectic layer but becomes eutectic like when it meets and dissolves into a glass solution. When the outer layer (C) melts into already molten glass the mixture stays within the liquidus phase, this is the conditioning layer which starts to move the glass mixture to a lower viscosity, more aggressive (high, i.e. alkaline, pH) mixture so it can react more readily with other minerals that become available during further reactions. The substituents of the outer layer can be melted and reacted through to, or near to, completion of their desired reaction, with the middle eutectic layer (B) not having melted, or only having partially melted. At that point, the temperature of the glass solution can be increased to a level which melts the middle eutectic layer (B) at or near to its eutectic point. In an alternative example, where the glass melt is kept at a generally constant temperature, the middle eutectic layer (B) melts at a higher rate than layers in standard glass batching technology. The reaction of the substituents of the middle eutectic layer can be melted and reacted through to, or near to, completion of their desired reaction, with the core (C) not having melted. At that point, the temperature of the glass solution can be increased to a level which melts the core (C). In an alternative example, where the glass melt is kept at a generally constant temperature, the core (C) melts into and reacts with the already liquidus partial glass at a higher rate than the silica present in standard glass batching technology. By this point other desirable reactions have taken place prior to the introduction of molten silica into the glass solution. The introduction of molten silica into the glass solution raises the viscosity of the glass solution, but does not interfere with other reactions which have already taken place upon melting and reaction of the outer layers.

In the non-limiting embodiment of FIG. 1, the middle eutectic layer B is a eutectic in the sense that the chemical composition, i.e. the ratio of $SiO_2$ and $Na_2O$, results in the liquidus glass melt reaching its eutectic point. In other embodiments, the chemical composition of the eutectic layer, e.g. the relative amounts of $SiO_2$ and $Na_2O$ in the middle eutectic layer of FIG. 1, can be such that the layer is a near eutectic. A near eutectic still results in greater energy efficiencies, relative to known glass batch technology, but the energy efficiencies are not as great as if the layer were a eutectic as such. In other words, the pellets of the present invention can have near eutectic layers and still provide beneficial effects. A near eutectic layer is close to the composition of a eutectic layer, with the chemical composition varying by up to 10% by weight of the composition of a eutectic layer. In other embodiments, the chemical composition of the near eutectic layer varies up to 9%, 8%, 7%, 6%, 5%, 4%, 3%, 2% and 1% by weight of the composition of a eutectic layer. In the example of eutectic layer B, where in Table 4 above the constituents are $SiO_2$ 75% w/w and $Na_2O$ is 25% w/w, a near eutectic varying by up to 10% by weight of the composition of a eutectic has compositions within $SiO_2$ 65% w/w and $Na_2O$ 35% w/w to $SiO_2$ 85% w/w and $Na_2O$ 15% w/w.

In alternative embodiments (not shown), there is no outer layer C and only a core A, surrounded by an outer eutectic or near eutectic layer B. In yet a further embodiment (not shown), there is an additional eutectic, near eutectic or non-eutectic layer over layer C, named layer D, which is the outer layer D. In further embodiments, there are additional layers up to any number of eutectic, near eutectic or non-eutectic layers (n layers) over the core. Examples of the number of eutectic, near eutectic or non-eutectic layers over the core comprising silica are: 2, 3, 4, 5, 6, 7, 8, 9, 10 and any other number. The layers can be in any combination of eutectic, near eutectic and non-eutectic layers. For example, all layers over the core comprising silica can be eutectic layers, all layers over the core comprising silica can be near eutectic layers, only one layer can be a eutectic layer, only one layer can be a near eutectic layer, more than one layer can be a eutectic layer, more than one layer can be a near eutectic layer; the more than one eutectic and/or near eutectic layers being separated by non-eutectic layers, or eutectic layers, or near eutectic layers, in any possible combination.

In the non-limiting example of FIG. 1, the layers are continuous in the sense that layer C does not contact layer A. In other embodiments, the layers are not continuous. For example, one layer can cover another layer or the core, but within that layer there may be the constituents of another layer in separated particulate form.

Method for Making Glass

Figure 2:
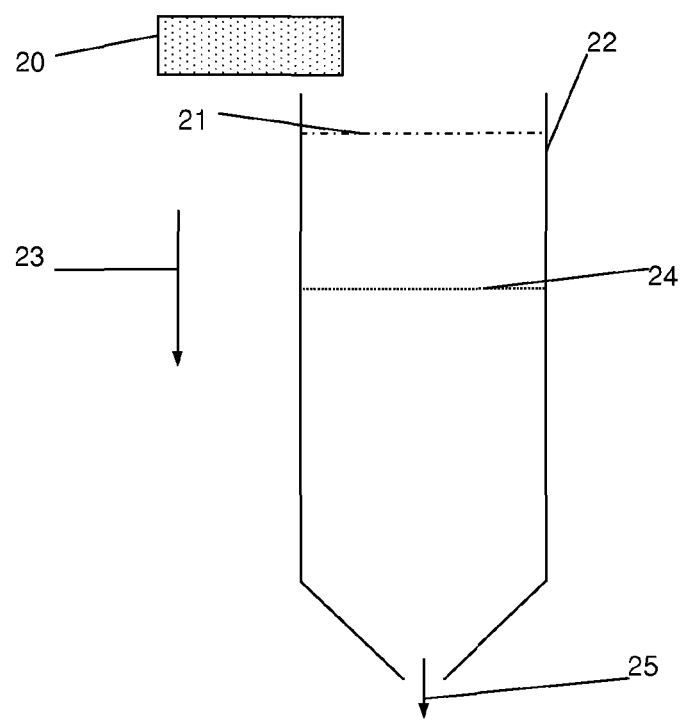
FIG. 2 is a schematic representation of a glass batch furnace.

Referring to FIG. 2, a glass melt furnace 22 is schematically represented. A number of pellets 20 have been made using the methods described above. Pellets 20 are introduced into the glass melt furnace 22. The pellets 20 can be of the type illustrated by FIG. 1, and discussed above.

The glass melt furnace 22 is heated by heaters (not shown). The glass melt furnace 22 can be heated to a constant temperature along its length. The glass melt furnace 22 can also have an incremental increase in temperature along the whole or a part of its length. The arrow 23 generally shows an increase in temperature from the top of the furnace to the bottom of the furnace. At the bottom of the furnace, arrow 25 shows the passage of molten glass once it has melted and reacted in the glass furnace 22. The molten glass taken out of the furnace can be processed as is standard for molten glass, e.g. to make glass panes and other glass wares.

There are two boundary lines shown by dashed lines 21 and 24 in FIG. 2. These two boundary lines generally show different interfaces between reactants in the glass furnace 22. When the pellets 20 are added into the glass furnace, they are solid pellets. The different layers of the pellets melt sequentially, and at different temperatures, going down the glass furnace 22 towards the exit (indicated by arrow 25). At the interfaces, indicated by dashed lines 21 and 24, the different layers of the pellet react with the already molten glass melt. In other words, after line 24, all of the contents of the pellet are melted and are reacting.

At the interface 24, for example, the molten glass reacts with different layers of the pellets.

FIG. 2 is schematic in the sense that there may be more or less of the interfaces generally indicated by lines 21 and 24, depending on the number of layers of the pellet, the temperatures chosen along the length of the furnace and the specific chemistries of each layer of the pellets.

The pellets of the present invention can be used to make glass. One exemplary process for making glass requires the addition of pellets into the top of a furnace which already contains a glass solution, as shown schematically by FIG. 2 and as discussed above.

When referring to a glass solution, it is common to refer to the thermodynamics of the glass solution with reference to the temperature at which different steps and/or features of the glass melt occur. For example, it is common to refer to the temperature at which a particular viscosity of the glass solution is reached.

In the exemplary pellet, as shown in FIG. 1 and described above, the outer layer C acts as a glass batch conditioner such that it reduces the viscosity of the molten glass and raises the molten batch alkali levels yielding an aggressive molten glass.

The middle layer B has eutectic melting chemistry and melts at 800 to 820° C. The preconditioned molten glass reacts with this layer to give a log 2 poise viscosity (equivalent to 10 Pa·s) from 1147 to 1368° C. (at loading ratios of batch to glass of 1:4 and 1:1 respectively). Final dissolution of the core A reintroduces silica into a silica deficient and aggressive glass batch which is in a condition to actively dissolve the remaining silica.

Viscosity units can be considered as follows:

10 Poise=10 P=1 Pa·s log(viscosity in Poise)=log(viscosity in Pa·s)+1 log 2 poise viscosity=100 Poise=10 Pa·s

The relative efficiency of each stage of the dissolution of each of the layers can be improved by introducing agents which release bubble forming agents within the core, e.g. sodium sulphate.

Table 6 below shows the temperatures at which the glass melt reaches a log 2 poise with reference to the exemplary pellet shown in FIG. 1 and discussed above at the respective loading rates.

TABLE 6

| Pellet to molten batch ratio | Temperatures (in deg C.) at which a log 2 poise viscosity is reached | | |
|---|---|---|---|
| | Outer layer C | Middle layer B | Core A |
| 1:4 | 1369 | 1368 | 1440 |
| 1:2 | 1299 | 1299 | 1440 |
| 1:1 | 1158 | 1147 | 1440 |

With no layering (i.e. absent the layering required by the present invention) the temperature at which a log 2 poise viscosity is reached would be 1440° C. In other words, the layers of the present invention lower the amount of energy required to form a uniform glass solution by delaying the time until the silica core is introduced into the glass solution. Furthermore, the use of layers which result in a highly alkaline glass solution, before reaching the core comprising silica, results in a more aggressive reaction chemistry when it comes to reacting the silica with the solution. Thus, the pellets of the present invention provide a means for lowering the amount of energy required to produce a glass solution, and therefore glass. The present invention facilitates the production of more glass per unit of energy used. Compared to glass pellets which do not have one or more eutectic layers, it is estimated that using the glass pellets of the present invention increase glass solution production efficiency by up to 15-20%. The pellets of the present invention comprising near eutectic layers provide similar increases in efficiency.

Figure 3:
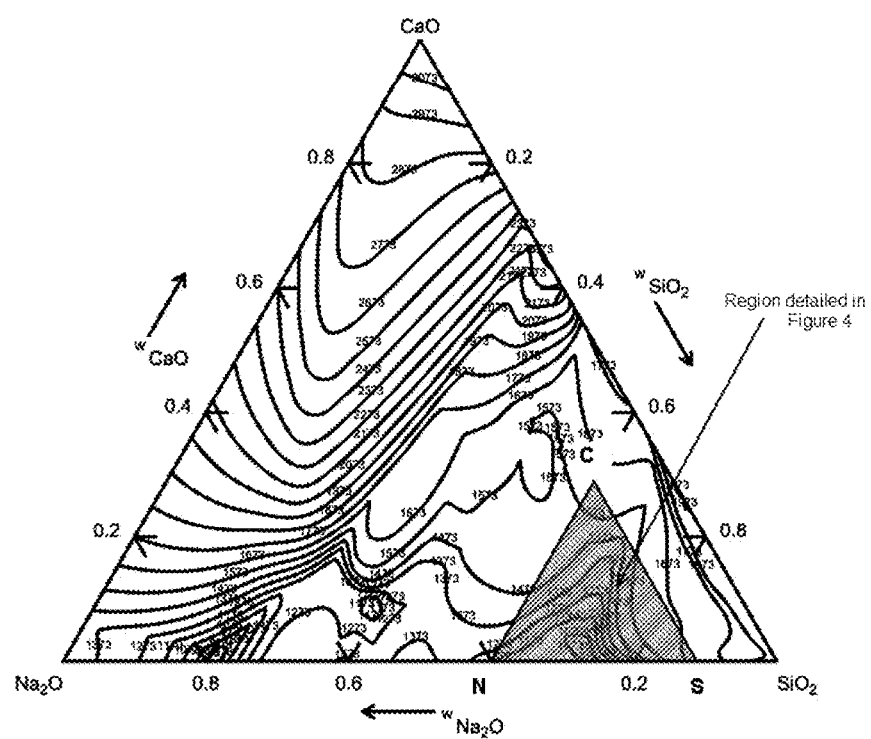
FIG. 3 is a phase diagram showing the full system for an $Na_2O$, $CaO$ and $SiO_2$ glass melt.
Figure 4:
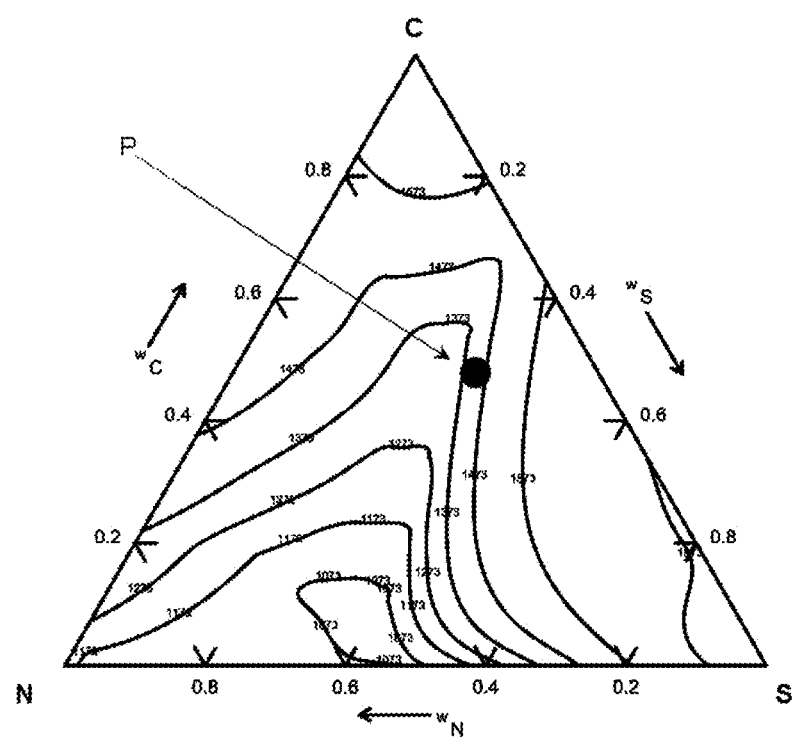
FIG. 4 is a phase diagram showing in detail a portion of the phase diagram of FIG. 3.
Figure 5:
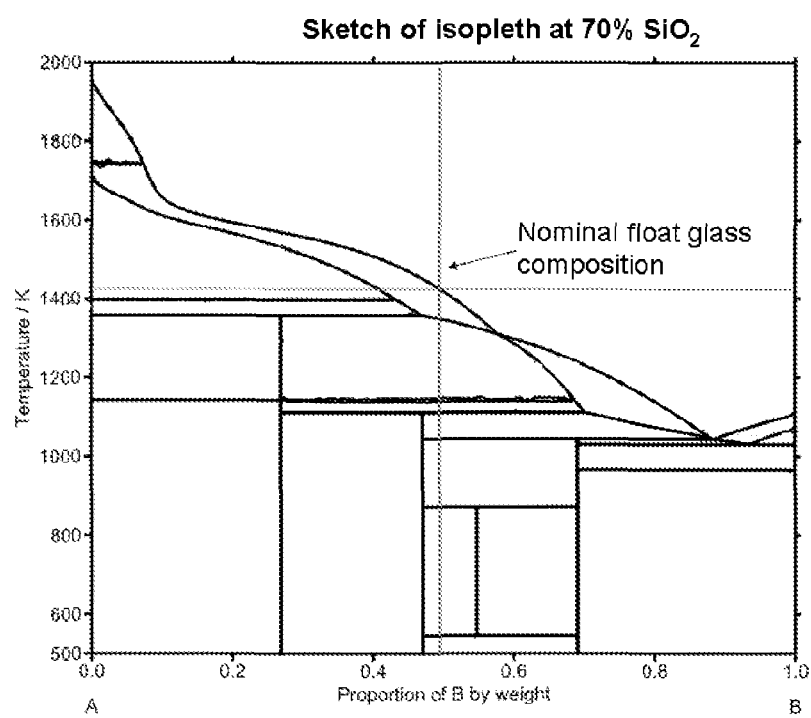
FIG. 5 is a phase diagram showing a cut through of the phase diagram of FIG. 4.

FIGS. 3, 4 and 5 are phase diagrams of the example, non-limiting, pellets described above.

FIG. 3 is a phase diagram showing the full system for an $Na_2O$, $CaO$ and $SiO_2$ pellet when in glass melt solution. The three axes show the ratios of constituents of the different components of an exemplary pellet. The corners show 100% $Na_2O$, $CaO$ and $SiO_2$, respectively. The lines show the temperature profiles of the liquidus glass melt at 1 atmosphere, dependent on the composition of the glass melt. The phase diagrams were calculated at 1 atmosphere Pa. The temperatures given on the line contour are given in Kelvin.

FIG. 4 is a phase diagram showing in detail a portion of the phase diagram of FIG. 3. At point N there is 40 wt % $Na_2O$, 0 wt % $CaO$ and 60 wt % $SiO_2$. At point C there is 10 wt % $Na_2O$, 30 wt % $CaO$ and 60 wt % $SiO_2$. At point S there is 10 wt % $Na_2O$, 0 wt % $CaO$ and 90 wt % $SiO_2$.

Point P shows the general area in which glass production is traditionally undertaken. A pellet according to the present invention, e.g. a pellet according to FIG. 1 and as described above, results in a glass melt with the characteristics shown in the vicinity of point P. Use of the pellets according to the present invention provides an alternative, more efficient, thermodynamic route to reach the vicinity of point P, that is, more efficient relative to conventional glass melts. Alternative pellets according to the present invention, other than those indicated by FIG. 1, also provide an alternative, more efficient, thermodynamic route to reach the vicinity point P.

FIG. 5 is a phase diagram showing a cut through the phase diagram of FIG. 4. This is a 2 dimensional phase diagram because the amount of $SiO_2$ is constant. At point A there are 0 wt % $Na_2O$, 30 wt % $CaO$ and 70 wt % $SiO_2$. At point B there are 30 wt % $Na_2O$, 0 wt % $CaO$ and 70 wt % $SiO_2$. The point indicated by the nominal float glass composition illustrates that potential energy savings should be expected by using an alternative thermodynamic route, as offered by a pellet of the present invention. It is possible to achieve a lower melting point of part of the pellet by changing the composition.

Figure 6:
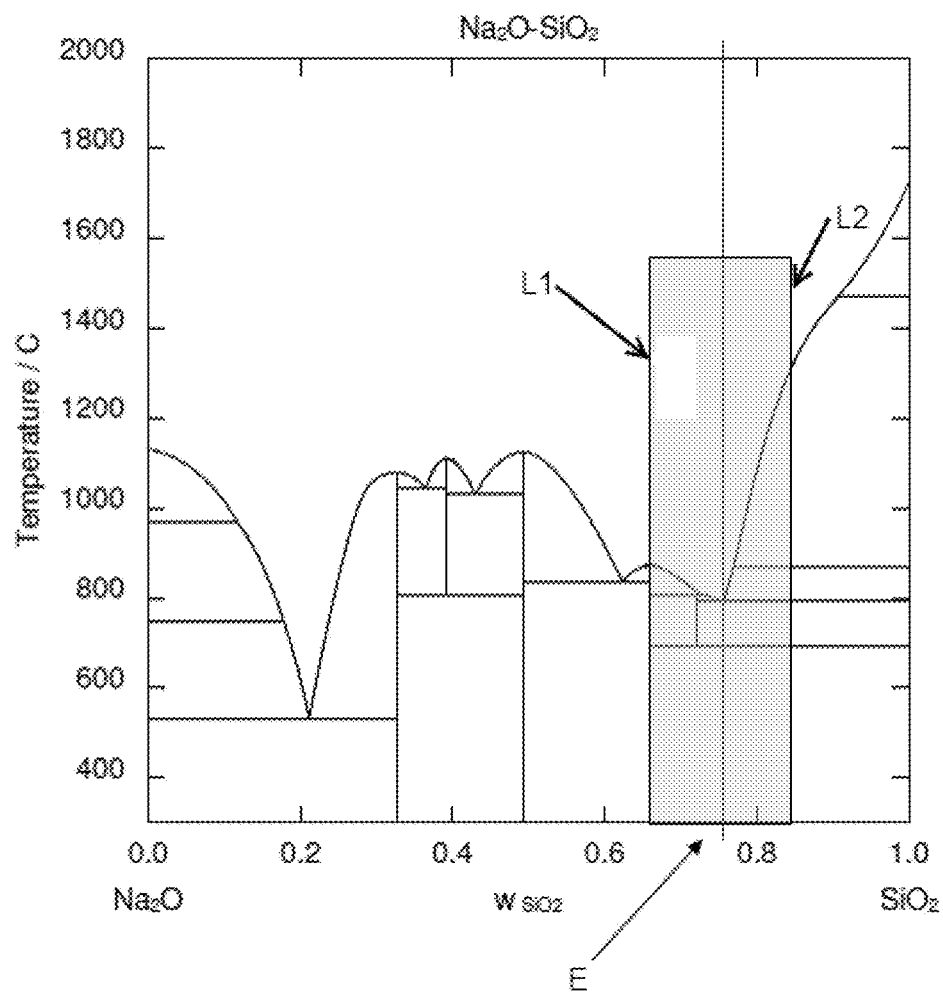
FIG. 6 is a phase diagram showing a cut through of the phase diagram of FIG. 4.

FIG. 6 is a 2 dimensional phase diagram of changing compositions of the eutectic layer B. The amount of $Na_2O$ decreases from 100% w/w at the left hand point on the x axis to 0% w/w at the right hand point on the x axis. The amount of $SiO_2$ increases from 0% w/w at the left hand point on the x axis to 100% w/w at the right hand point on the x axis. Point E identifies the line showing the eutectic point, which line intersects the x axis to show the ratio of $Na_2O$ to $SiO_2$ at the eutectic point (i.e. the composition of eutectic layer B in the non-limiting example above, where the eutectic point is reached). Lines L1 and L2 show variations in the chemical composition of the eutectic layer B which still provide beneficial efficiency savings, i.e. these lines show the compositions of near eutectic compositions. Lines L1 and L2 show 10% variations by weight in the chemical compositions of the eutectic layer B, i.e. L1 shows 65% w/w $SiO_2$ and 35% w/w $Na_2O$, while L2 shows 85% w/w $SiO_2$ and 15% w/w $Na_2O$. In other embodiments, the chemical compositions of the near eutectic layers can vary by up to 9%, 8%, 7%, 6%, 5%, 4%, 3%, 2% and/or 1% by weight of the composition of a eutectic layer.

The compositions of the pellets of the present invention, for example those described above and shown in FIG. 1, utilise specific amounts of glass component ingredients. By utilising eutectic and near eutectic layers specifically, it is possible to create a glass melt where thermodynamic troughs are utilised, thereby maximising the efficiency of glass production.

Pelletization of glass batches is a common concept. According to the present invention, the composition of the batch pellets, in total, keeps the chemistry within expected limits for the type of glass to be manufactured. However, the pellets are prepared by way of a layering process. The layering process allows glass to be made with lower kinetic constrains in the melting stage which allows for lower energy consumption, overall, and increased efficiency.

The layered pellets of the present invention have the following beneficial properties:
1) selected batch materials are available for dissolution into the glass melt sequentially, i.e. at different temperatures.
2) layers around the core are separately formulated to achieve a composition, which can be a eutectic or near eutectic composition, for that layer with a defined liquidus characteristic.
3) for each application, i.e. for different types of glass, a series of different one and/or two and/or three and/or more component layer eutectics and non-eutectics is used which, when viewed in totality, achieve the final batch melt chemistry for that glass type.
4) melt accelerators and/or glass conditioners of various types may be included in the different layers, as required. These melt accelerators and/or glass conditioners can include, but are not limited to, oxygen sources (e.g. antimony and cerium), redox condition additives (e.g. carbon and other materials which remove oxygen from the glass), decolourises (e.g. selenium, barium selenite and erbium oxide). Cullet and other melt accelerators may be added as required; each of these may be included in the specific layer desired by the glass engineer so that their time of availability (during the glass production process) and release into the glass batch is selected and optimised for their reaction and inclusion into the glass.
5) raw materials used to make the pellets of the present invention are those used generally in glass making including, but not limited to, silica, limestone and dolomite (raw or calcined), soda ash, saltcake, calumite, kaolin, rouge, carbon, magnesite, boric acid, colemanite, ulexite, fluorspar, zinc oxide, anorthosite, sodium and potassium feldspars, nepheline, nepheline syentite, sodium silicate, cullet.
6) pellet binders, i.e. binders for binding different layers, include, water, aqueous solutions of sodium silicate, clay and cement.
7) pelletization processes are the same as available in industry in the form of standard pelletizers and mixers (e.g. 'Lancaster mixers'), but each layer is built up progressively starting with the inner core, which may be a single mineral (silica) or a eutectic blend of minerals and chemical and proceeding with each layer in a stepwise process.
8) as each layer is formed, intermediate drying steps or mechanical consolidation may be used, each layer may be bound by a different bind chemical or chemicals.
9) waste heat recovered from the glass making process may or may not be used to dry and elevate the pellet temperature.
10) material particle sizes used for the pellets will be those typically used within the industry at this time or may be modified to give faster and lower temperature reactions, as needed.
11) ground materials may also be included.
12) final pellet sizes are not fixed.

The overall compositions of certain, non-limiting glasses made using the pellets of the present invention are shown in tables 7 and 8 (FIGS. 7 and 8, respectively). The ingredients of the overall compositions are prepared as pellets according to the present invention.

In another aspect of the present invention, decolourisers (e.g. selenium, barium selenite and erbium oxide) can be included in the core, for example core A of the pellet described with reference to FIG. 1. Decolourisers tend to be volatile and flare off during the glass melt processes. By including decolourisers in the core, their tendency to flare off is reduced. In other words, by including decolourisers in the core of pellets, less decolouriser is required because less is wasted by volatilisation. This saves on cost and improves efficiency, i.e. by wasting less material.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A pellet for use in a glass batch process, the pellet comprising:
a core comprising silica ($SiO_2$); and
one or more layers over the core, at least one of the one or more layers over the core being a eutectic layer or a near eutectic layer, wherein at least one of the one or more layers over the core consists essentially of a eutectic or near eutectic mixture of $SiO_2$ and $Na_2O$, and wherein a near eutectic layer varies in composition by up to 10% by % w/w from a eutectic composition.

2. The pellet of claim 1, wherein the near eutectic layer varies in composition by up to 9% by % w/w from the eutectic composition.

3. The pellet of claim 1, comprising:
one eutectic layer or near eutectic layer over the core; and
one non-eutectic layer over the one eutectic or near eutectic layer over the core.

4. The pellet of claim 1, comprising:
two eutectic or near eutectic layers over the core.

5. The pellet of claim 1, comprising:
three or more eutectic, near eutectic, or eutectic and near eutectic layers over the core.

6. The pellet of claim 1, wherein the core comprises one or more decolourisers.

7. The pellet of claim 1, wherein at least one of the one or more layers over the core consists essentially of a mixture of $Na_2CO_3$ and $CaCO_3$.

8. The pellet of claim 1, wherein the pellet comprises:
a first eutectic layer or near eutectic layer over the core consisting essentially of a eutectic or near eutectic mixture of $SiO_2$ and $Na_2O$; and
a second layer over the first eutectic layer consisting essentially of a mixture of $Na_2CO_3$ and $CaCO_3$.

9. The pellet of claim 1, wherein the pellet comprises all of the ingredients for preparing a glass by a batch process.

10. A method of making a pellet for use in a glass batch process, the pellet comprising:
a core comprising silica ($SiO_2$); and
one or more layers over the core, at least one of the one or more layers over the core being a eutectic layer or a near eutectic layer, wherein at least one of the one or more layers over the core consists essentially of a eutectic or near eutectic mixture of $SiO_2$ and $Na_2O$, and wherein a near eutectic layer varies in composition by up to 10% by % w/w from a eutectic composition;

the process comprising the steps of:
pelletising the components of the core to yield a pelletised core; and
pelletising the components of the at least one of the one or more layers over the core, wherein the at least one of the one or more layers over the core comprises a first eutectic or near eutectic layer,
wherein the pelletised core comprises silica, so that the components of the first eutectic or near eutectic layer form a eutectic or near eutectic layer over the core.

11. The method of claim 10, further comprising the step of:
pelletising the components of a non-eutectic layer over the pellet comprising the core and the first eutectic or near eutectic layer.

12. The method of claim 11, wherein the step of pelletising the components of a non-eutectic layer over the pellet includes pelletising a mixture of $Na_2CO_3$ and $CaCO_3$.

13. The method of claim 10, further comprising the step of:
pelletising a further eutectic layer or a further near eutectic layer over the core.

14. The method of claim 10, wherein the step of pelletising the components of the first eutectic or near eutectic layer includes pelletising a eutectic mixture or near eutectic mixture of $SiO_2$ and $Na_2O$ over the core.

15. A method of making glass, the method comprising the steps of:
introducing one or more pellets into a glass melt furnace, each pellet comprising:
a core comprising silica ($SiO_2$); and
one or more layers over the core, at least one of the one or more layers over the core being a eutectic layer or a near eutectic layer, wherein at least one of the one or more layers over the core consists essentially of a eutectic or near eutectic mixture of $SiO_2$ and $Na_2O$, and wherein a near eutectic layer varies in composition by up to 10% by % w/w from a eutectic composition;
heating the one or more pellets to produce a glass solution; and
cooling the glass solution to make a glass.

16. The method of claim 15, wherein the near eutectic layer varies in composition by up to 9% by % w/w from the eutectic composition.

\* \* \* \* \*